US010889970B2

(12) United States Patent
Son

(10) Patent No.: US 10,889,970 B2
(45) Date of Patent: Jan. 12, 2021

(54) SINK TAP STRUCTURE MOVING UP AND DOWN THROUGH COOPERATIVE OPERATION WITH SHELF MOVING UP AND DOWN

(71) Applicant: Won-hee Son, Busan (KR)

(72) Inventor: Won-hee Son, Busan (KR)

( * ) Notice: Subject to any disclaimer, the term of this patent is extended or adjusted under 35 U.S.C. 154(b) by 0 days.

(21) Appl. No.: 15/249,395

(22) Filed: Aug. 27, 2016

(65) Prior Publication Data

US 2017/0233987 A1 Aug. 17, 2017

(30) Foreign Application Priority Data

Feb. 16, 2016 (KR) .......................... 10-2016-001778

(51) Int. Cl.
*E03C 1/04* (2006.01)
*E03C 1/324* (2006.01)
*A47B 51/00* (2006.01)

(52) U.S. Cl.
CPC ............ *E03C 1/0404* (2013.01); *A47B 51/00* (2013.01); *E03C 1/324* (2013.01); *A47B 2220/03* (2013.01); *E03C 2001/0414* (2013.01)

(58) Field of Classification Search
CPC ............. E03C 1/328; E03C 2001/0417; E03C 2201/90; E03C 1/0404; A47B 51/00; A47B 2220/03
USPC .............. 137/801; 312/312; 4/630, 645, 661
See application file for complete search history.

(56) References Cited

U.S. PATENT DOCUMENTS

| | | | | |
|---|---|---|---|---|
| 2,050,617 A | * | 8/1936 | Litner | A47L 15/4242 312/210 |
| 3,486,175 A | * | 12/1969 | Schwartz | E03C 1/324 4/645 |
| 5,230,109 A | * | 7/1993 | Zaccai | E03C 1/324 4/643 |
| 5,867,847 A | * | 2/1999 | Klawitter | E03C 1/324 312/247 |
| 5,909,933 A | * | 6/1999 | Keene | A47B 9/10 312/140.1 |
| 6,877,825 B2 | * | 4/2005 | Khosropour | A47B 51/00 312/140.1 |
| 7,389,796 B2 | * | 6/2008 | Vilhelmsen | E03C 1/0404 137/616.5 |

(Continued)

FOREIGN PATENT DOCUMENTS

WO WO2013170955 * 11/2013 ............. A47B 77/02

*Primary Examiner* — David P Angwin
*Assistant Examiner* — Nicholas A Ros
(74) *Attorney, Agent, or Firm* — Renaissance IP Law Group LLP

(57) ABSTRACT

The present invention relates to a sink tap structure moving up and down through a cooperative operation with a shelf moving up and down, including: shelf frames coupled to a screw bar in the form of male/female screws to move up and down along rails attached to the inner surface of a cupboard by rotation of the screw bar, the screw bar being rotatably coupled to a servo motor disposed inside a cupboard frame; a first stage shelf located close to a user when pulls by means of sliding members slidingly coupled to casing members disposed on the lower portions of the shelf frames and returned to the original position thereof when pushes by means of the sliding members; and a tap coupled to an elevating bar in such a manner as to move up and down by means of the up and down movements of the elevating bar.

20 Claims, 6 Drawing Sheets

(56) References Cited

U.S. PATENT DOCUMENTS

| | | | | |
|---|---|---|---|---|
| 7,743,716 B1* | 6/2010 | Burka | ............... | A47B 9/12 |
| | | | | 108/147 |
| 2007/0241650 A1* | 10/2007 | Schmitt | ............ | A47B 51/00 |
| | | | | 312/312 |
| 2010/0231105 A1* | 9/2010 | Latif | ............ | A47B 46/005 |
| | | | | 312/293.1 |
| 2015/0096950 A1* | 4/2015 | Engel | ............ | A47B 46/00 |
| | | | | 211/90.02 |

* cited by examiner

SINK TAP STRUCTURE MOVING UP AND DOWN THROUGH COOPERATIVE OPERATION WITH SHELF MOVING UP AND DOWN

BACKGROUND OF THE INVENTION

Field of the Invention

The present invention relates to a sink tap structure moving up and down through a cooperative operation with a shelf moving up and down that is configured wherein a sink and a tap move up and down through the cooperative operations with the shelf moving up and down above the sink, thereby allowing the objects such as seasonings, dishes and so on put on the shelf to be taken and used conveniently and safely by the hands of a user like the disabled or the aged sitting in a wheelchair.

Background of the Related Art

According to conventional practices, a kitchen shelf located above a sink that moves up and down by means of a motor and wires is disclosed in Korean Utility Model Publication No. 20-2000-0017984.

In the conventional shelf, however, if the shelf is located just above a tap of the sink, the shelf collides against the tap after a little moving down, so that the hands of a user like the aged or the disabled sitting in a wheelchair cannot reach the objects put on the shelf. Further, as the shelf moves up and down through the wires, it may shake during the movements, and also, the wires may cut due to the heavy weight of the shelf, thereby undesirably making the shelf fall down. The fall accident may cause glass dishes to be broken out, thereby failing to safely protect the user from the sharp glass pieces.

One of such conventional technologies is disclosed in Korean Utility Model Registration No. 20-0211375 wherein a sink adjustable in height by means of a driving motor and wires is suggested, but according to the conventional sink, if a shelf is located above a tap and a sink moving up and down, it collides against the tap even after a little moving down, thereby making it hard to use the shelf itself.

Under the conventional technologies, like this, the objects put on the shelf cannot be taken and used conveniently and safely by the disabled or the aged sitting in the wheelchair. Accordingly, there is a need for development of a new sink tap structure moving up and down through cooperative operations with a shelf moving up and down, so that the objects put on the shelf above a sink can be taken and used conveniently and safely by the user who sits in a wheelchair.

SUMMARY OF THE INVENTION

Accordingly, the present invention has been made in view of the above-mentioned problems occurring in the prior art, and it is an object of the present invention to provide a sink tap structure moving up and down through a cooperative operation with a shelf moving up and down that is capable of allowing the objects put on the shelf above a sink to be taken and used conveniently and safely by a user who sits in a wheelchair.

To accomplish the above-mentioned object, according to the present invention, there is provided a sink tap structure moving up and down through a cooperative operation with a shelf moving up and down, the sink tap structure including: shelf frames coupled to a screw bar in the form of male/female screws in such a manner as to move up and down along rails attached to the inner surface of a cupboard by means of the rotation of the screw bar, the screw bar being rotatably coupled to a servo motor disposed inside a cupboard frame; a first stage shelf located close to a user when pulls by means of sliding members slidingly coupled to casing members disposed on the lower portions of the shelf frames and returned to the original position thereof when pushes by means of the sliding members; and a tap operating cooperatively with the shelf frames moving up and down and coupled to an elevating bar in such a manner as to move up and down by means of the up and down movements of the elevating bar, the elevating bar being coupled to a gear of a rotary shaft of a servo motor located under a sink in such a manner as to move up and down through the rotation of the gear.

According to the present invention, preferably, the height of the tap located on the sink is decreased by means of the up and down movements of the sink coupled to a screw bar in the form of male/female screws through the rotation of the screw bar, the screw bar being rotatably coupled to a servo motor located under the sink.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, an explanation on a sink tap structure moving up and down through a cooperative operation with a shelf moving up and down according to the present invention will be in detail given with reference to the attached drawings.

According to the present invention, a shelf for a cupboard located above a sink can be sufficiently close to the disabled or the aged sitting in a wheelchair in a safe manner, and further, a tap can move up and down through a cooperative operation with the up and down movements of the shelf. Of course, a first stage shelf can be pullingly closer to the user, and the upper stage shelf located above the first stage shelf can much more move down. Furthermore, the sink at which the tap is located moves down, thereby permitting the shelf to much more move down.

Figure 1:
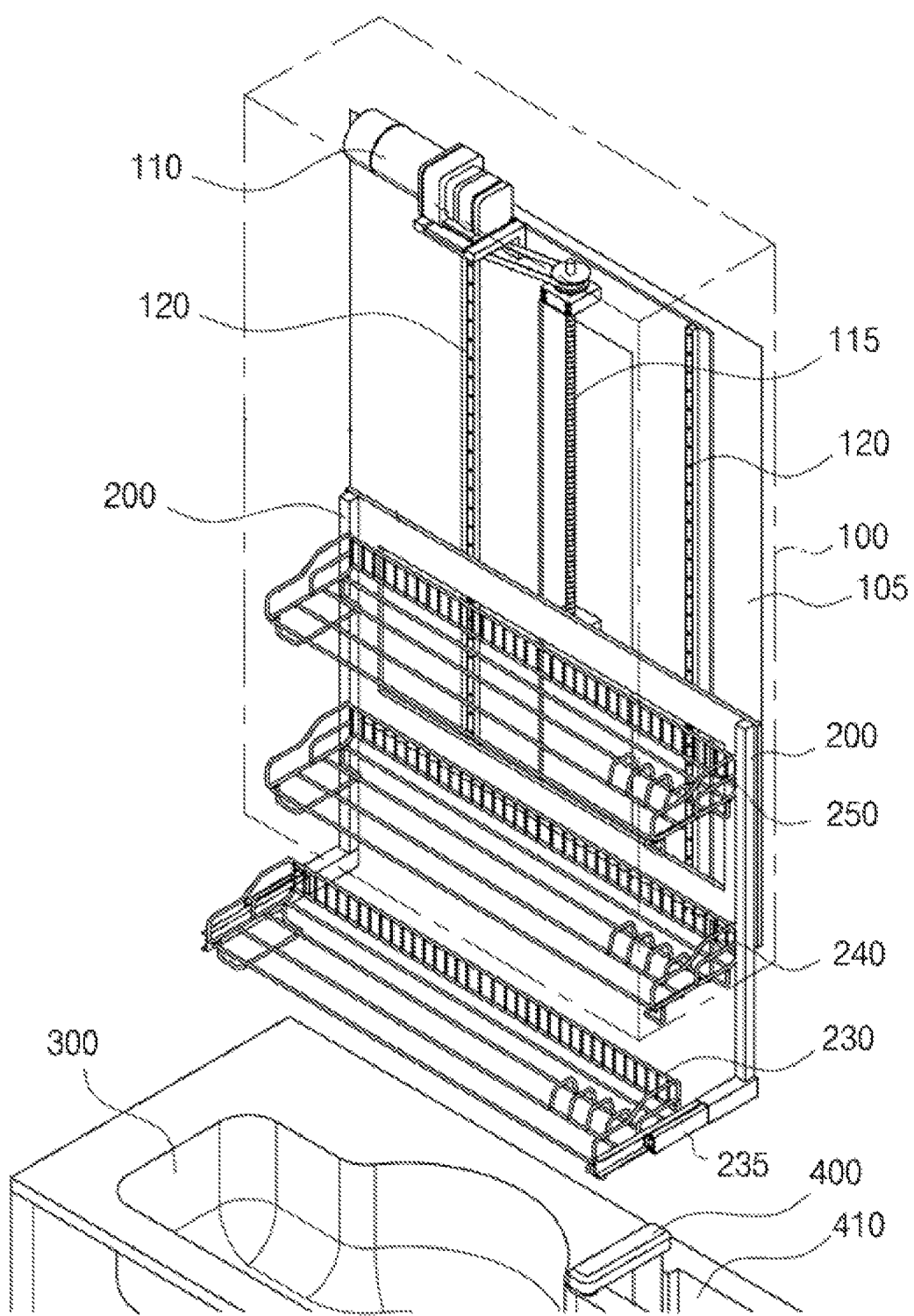
FIG. 1 is a front photograph showing a sink tap structure moving up and down through a cooperative operation with a shelf moving up and down according to the present invention.
Figure 2:
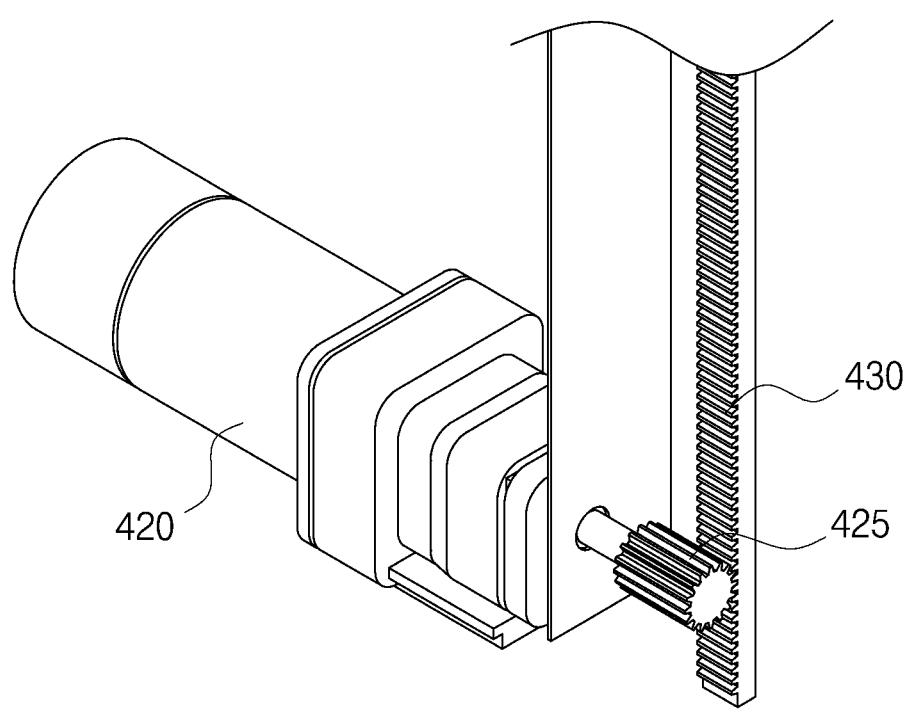
FIG. 2 is a photograph showing the parts for moving a tap up and down in the sink tap structure according to the present invention.

FIG. 1 is a front photograph showing a sink tap structure moving up and down through a cooperative operation with a shelf moving up and down according to the present invention. A servo motor 110 rotates by means of a switching operation, and thus, a screw bar 115, which is coupled to gears of the servo motor 110, rotates, so that shelf frames 200 coupled to the screw bar 115 in the form of male and female screws move down. Accordingly, if the lower portion of a first stage shelf 230 becomes close to a tap 400, the movement to the tap 400 is sensed by means of a sensor (not shown), and accordingly, a servo motor 420 located under a sink 300 rotates. As a result, an elevating bar 430 (See FIG. 2) coupled to a gear 425 of a rotary shaft of the servo motor 420 moves down, and thus, the tap 400 moves down. The tap 400 moves up and down through a hole 410 formed through the sink 300, and the tap 400 is coupled to the elevating bar 430 on the lower portion thereof. The elevating bar 430 and the gear 425 of the rotary shaft of the servo motor 420 are engagedly coupled to each other, and the servo motor 420 is located under the sink 300.

According to the present invention, two rails 120 are attached up and down to the inner wall 105 of a cupboard, and the shelf frames 200 move up and down along the rails 120. In this case, the shelf frames 200 have rail grooves (not shown) fitted to the rails. Accordingly, even if the shelf has a heavy weight by the objects put thereon, such as dishes, washing tools, foods and the like, the shelf can move up and down safely through the coupling with the rails 120, without being shaken.

If the shelf frames 200 move up and down by winding wires up, like the conventional practice, the wires may cut by the weight of the shelf, but according to the present invention, even if a failure occurs, the shelf can stop at a given position by means of the use of the screw bar 115, thereby basically preventing the shelf from falling down.

Figure 6:
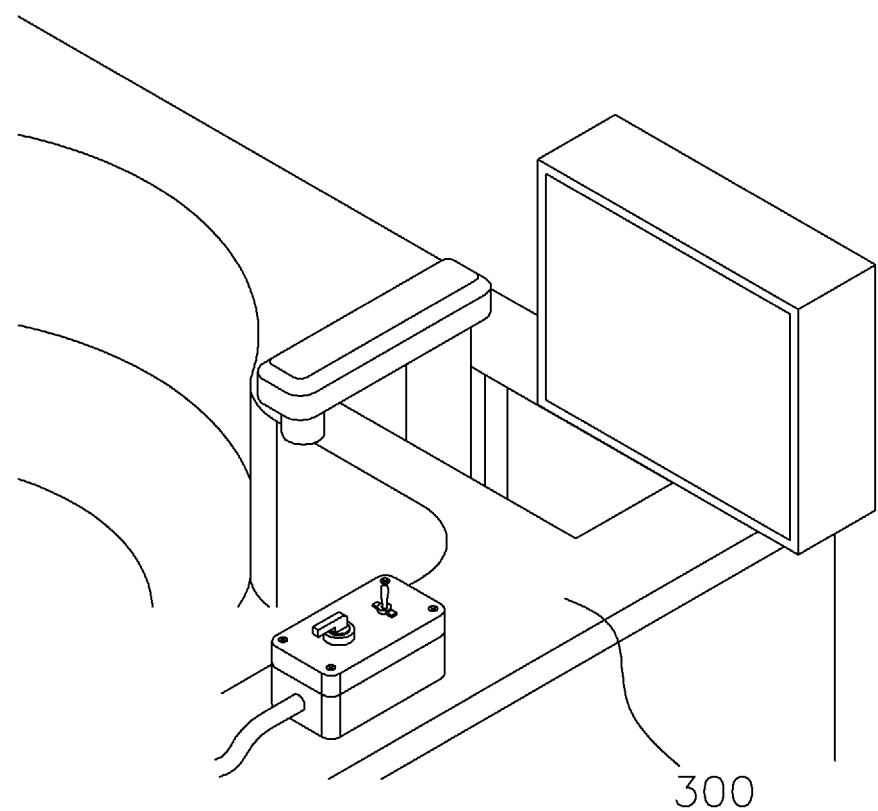
FIG. 6 is a photograph showing a control box and an operating switch applied to the sink tap structure according to the present invention.

If the shelf frames 200 and the tap 400 reach given positions, they stop, which is of course set by means of a controller. FIG. 6 is a photograph showing a control box and an operating switch applied to the sink tap structure according to the present invention. A control technology for controlling the elevating operation and the elevating height through a position sensor and a servo motor is typically adopted in various technological fields, and therefore, a detailed explanation on the control technology will be avoided for the brevity of the description.

The shelf is multi-staged up and down. However, actually, it is hard to sufficiently move the uppermost stage shelf down only through the downward movements of the first state shelf 230, the tap 400 and the sink 300, and according to the present invention, the sink 300 on which the tap 400 moving up and down is located can move up and down so as to allow the shelf frames 200 to much more move up and down. Accordingly, if the sink 300 moves down, the shelf frames 200 can move down.

Figure 3:
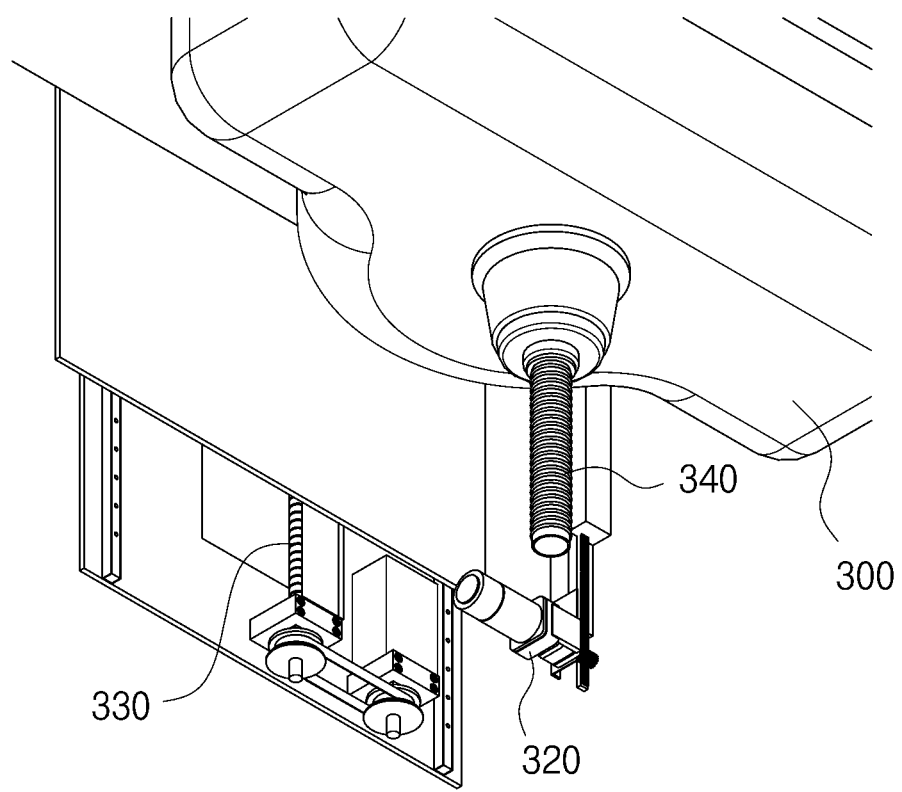
FIG. 3 is a photograph showing the parts for moving a sink up and down in the sink tap structure according to the present invention.

As shown in FIG. 3, a drain pipe 340 and a servo motor 320 are located under the sink 300, and a screw bar 330 is rotatably coupled to the servo motor 320. The screw bar 320 is coupled to the sink 300 in the form of male/female screws, so that the sink 300 moves up and down through the rotation of the screw bar 320.

Further, a sink frame (not shown) is provided to locate the servo motor 320 and the screw bar 330 on the bottom thereof and to supportingly hold the sink 300, and through the rotation of the screw bar 320, the sink 300 comes into contact with the sink frame and thus moves up and down.

Figure 4:
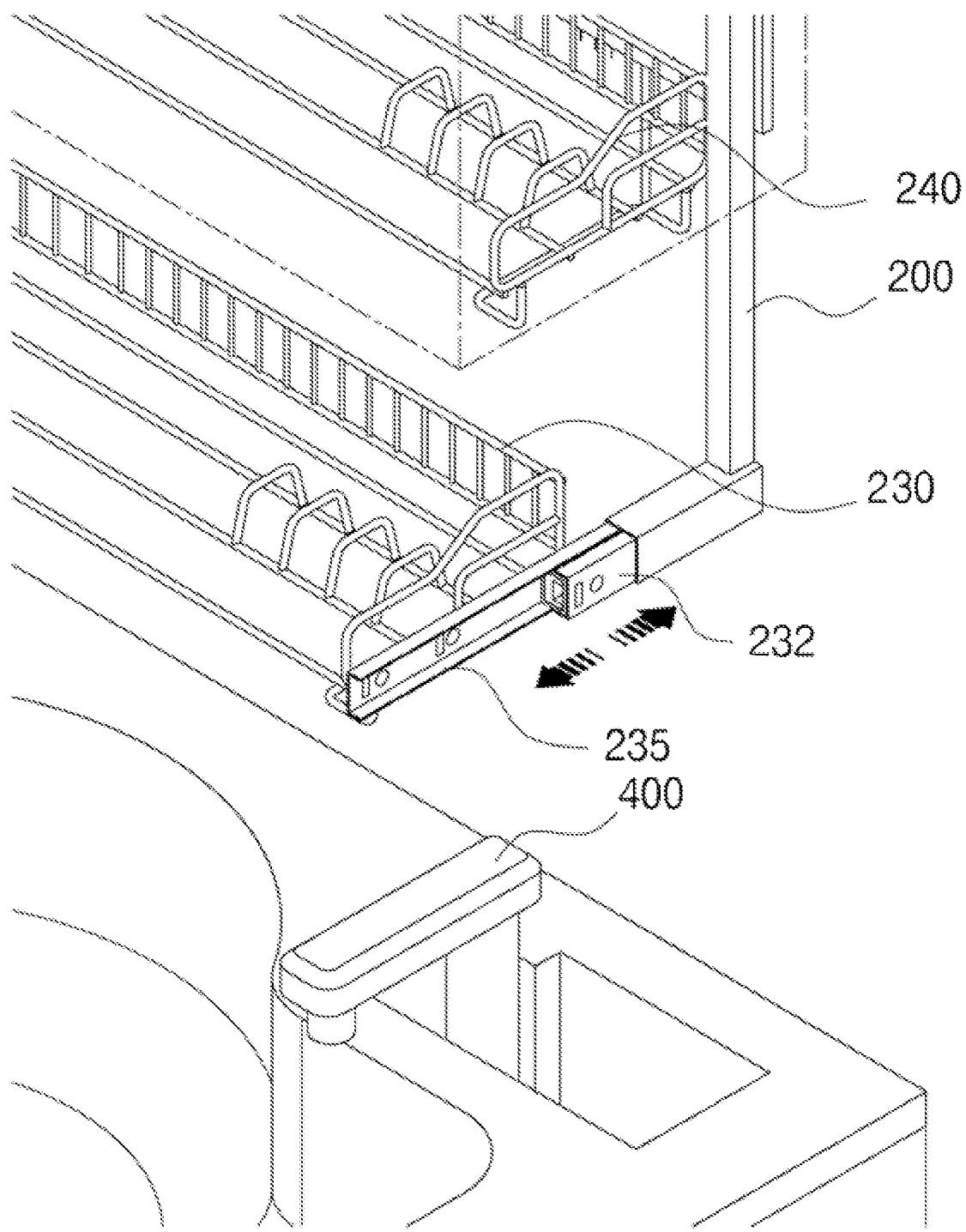
FIG. 4 is a photograph showing the forward and backward sliding of a three-stage shelf in the sink tap structure according to the present invention.

As shown in FIG. 4, the first stage shelf 230 is connected to the upper stage shelf 250 located thereabove by means of the shelf frames 200, and sliding members 232 and 235 are located on the lower ends of the shelf frames 200 so as to allow the shelf to slidingly move forward and backward (wherein the position at which the user is located is the front side and the wall position to which the shelf is attached is the back side). If the first stage shelf 230 pulls toward the user, the hands of the user sitting in the wheelchair become closer to the objects put on the first stage shelf 230 that pulls forward and to the objects put on the upper stage shelf 250 located above the first stage shelf 230 that more move down.

So as to allow the shelf to be closer to the user who sits in the wheelchair, as shown in FIG. 4, the first stage shelf 230 pulls forward, and in the state where the first stage shelf 230 pulls forward, if the upper stage shelf 250 located above the first stage shelf 230 moves down, a second stage shelf 240 moves down to the position where the first stage shelf 230 is located, so that the hands of the user sitting in the wheelchair can be closer to the objects put on the second stage shelf 240 located above the first stage shelf 230.

Figure 5:
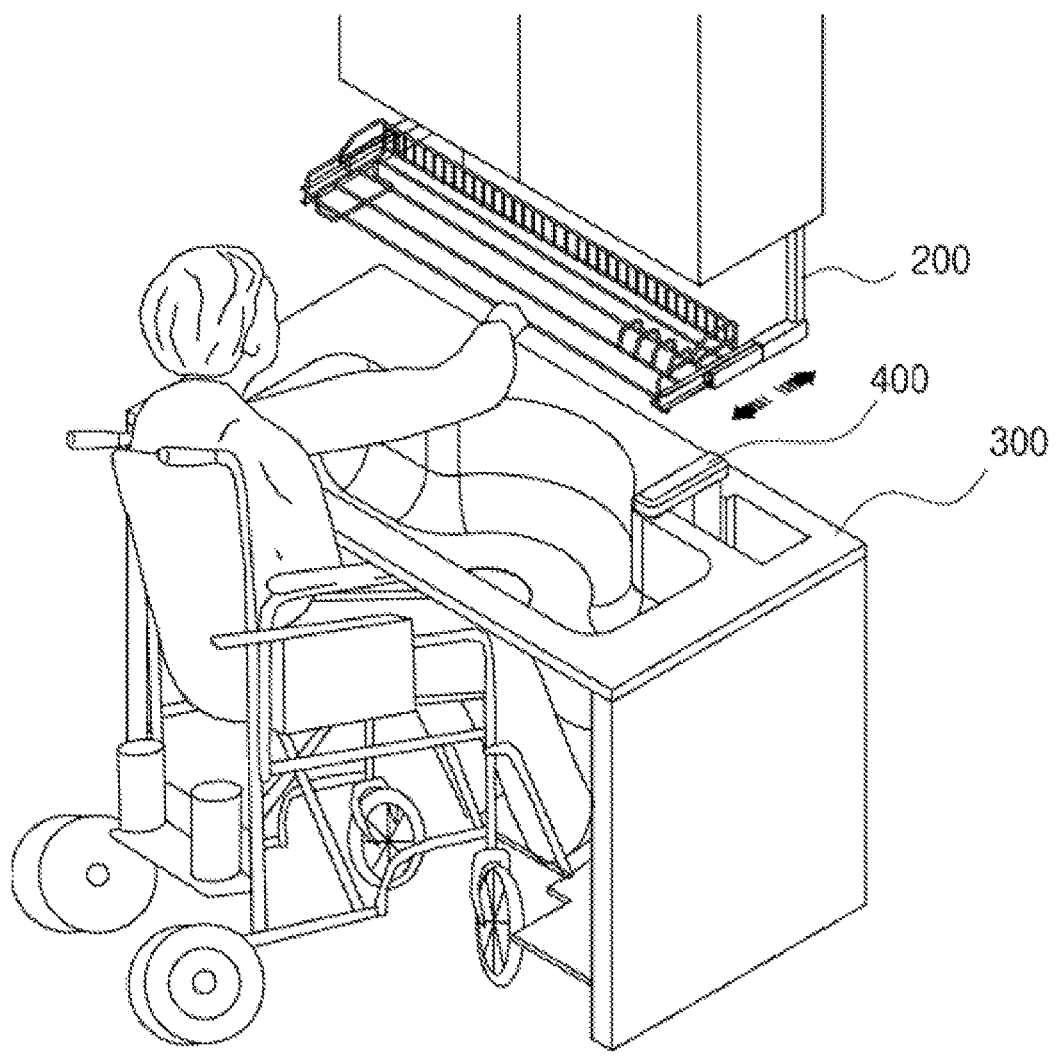
FIG. 5 is a photograph showing the use state of the sink tap structure according to the present invention by a user who sits in a wheelchair.

FIG. 5 shows the use state of the sink tap structure according to the present invention wherein the shelf, the tap and the sink move down, thereby allowing the hands of the user sitting in the wheelchair to reach the objects put on the shelf.

As described above, the sink tap structure moving up and down through the cooperative operation with the shelf moving up and down according to the present invention is configured wherein the tap moves up and down through the cooperative operation with the shelf, the first stage shelf is pullingly closer to the user to allow the second stage shelf to move down to the original position of the first stage shelf, and the sink on which the tap is located moves up and down to allow the first stage shelf just thereabove, on which dishwashing liquids, washing tools, seasoning containers, foods, dishes and so on are put, to move down to a sufficient height, so that the shelf is close to the user sitting in the wheelchair, such as the disabled, the aged and so on through the switching manipulation, thereby allowing the objects on the shelf to be taken and used conveniently and safely by the user, and, unlike the conventional practice wherein the shelf frames move up and down by winding up the wires, but undesirably, the wires may be cut by the weight of the shelf to cause the shelf to fall down, the shelf frames move up and down by means of the screw bar according to the present invention to basically prevent the shelf from falling down, thereby providing the convenient and safe use thereof for the disabled or the aged sitting in the wheelchair.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:
1. A sink tap comprising:
a cupboard;
a pair of shelf frames coupled a panel which, in turn, is coupled to a screw bar in the form of male/female screws in such a manner as to move up and down along rails attached to the inner surface of the cupboard by means of the rotation of the screw bar;
a first servo motor disposed inside a cupboard frame and coupled to the screw bar;
sliding members coupled directly to the pair of shelf frames, wherein the sliding members are movable up and down with the panel;

a first stage shelf coupled to the sliding members, wherein the first stage shelf is movable forward and backward relative to the pair of shelf frames by means of the sliding members, wherein the first stage shelf is movable up and down with the panel, and wherein the first stage shelf is movable to a position outside the cupboard;

a second stage shelf coupled directly to the pair of shelf frames and above the sliding members, wherein the second stage shelf is movable up and down with the panel;

an upper stage shelf coupled directly to the pair of shelf frames and above the second stage shelf, wherein the upper stage shelf is movable up and down with the panel;

a sink located below the cupboard;

a tap extending through a hole formed through the sink, wherein the tap is coupled to an elevating bar in such a manner as to move up and down relative to the sink by means of the up and down movements of the elevating bar; and a second servo motor located under the sink, wherein the second servo motor includes a gear of a rotary shaft that moves up and down the elevating bar, and wherein the second servo motor automatically lowers the tap relative to the sink in response to the motion of the first stage shelf.

2. The sink tap according to claim 1, wherein the first stage shelf slidingly moves forward to extend beyond the cupboard.

3. The sink tap according to claim 1, wherein the upper stage shelf is wheelchair accessible.

4. The sink tap according to claim 1, wherein shelf frame extends beyond the rails attached to the inner surface of a cupboard.

5. The sink tap according to claim 1, wherein the first stage shelf extends forward over the sink and is movable downward while extended forward over the sink to extend below the bottom of the cupboard.

6. The sink tap according to claim 1, wherein the upper stage shelf is movable down via the motion of the first stage shelf while extended.

7. The sink tap according to claim 1, wherein the upper stage shelf is movable down via the motion of the first stage shelf to a position allowing access for a user in a wheelchair.

8. The sink tap according to claim 1,
wherein the first servo motor rotates the screw bar at an end of the screw bar orthogonal to the panel;
wherein the pair of shelf frames coupled to the panel move up and down along rails attached to the inner surface of the cupboard by means of rotation of the screw bar by the first servo motor alone;
wherein the first stage shelf and the second stage shelf include a range of motion to allow a user in a wheelchair to reach objects on each of the first stage shelf and the second stage shelf;
wherein the objects on each of the first stage shelf and the second stage shelf include a weight;
wherein the screw bar stops the first stage shelf and the second stage shelf from moving up and down due to the weight of the objects;
wherein the screw bar stops the first stage shelf and the second stage shelf from moving up and down at a given position along the screw bar; and
wherein the screw bar stops the first stage shelf and the second stage shelf from moving up and down only in a predetermined failure condition.

9. The sink tap according to claim 1,
wherein the sink is coupled to a second screw bar in the form of male/female screws through the rotation of the second screw bar, the second screw bar being rotatably coupled to a third servo motor located under the sink in such a manner as to move the sink up and down by means of the rotation of the second screw bar.

10. The sink tap according to claim 9, wherein the second servo motor automatically lowers the tap when a sensor detects the proximity of a lower portion of the first stage shelf to the tap, and
wherein the third servo motor rotates the second screw bar to further lower the sink with the tap,
and wherein the third servo motor supports the sink.

11. The sink tap according to claim 10, wherein moving both the tap down and the sink down allows the first stage shelf to move further down than moving either the tap or the sink alone.

12. The sink tap according to claim 11,
wherein the rotation of the second screw bar by the third servo motor moves up and down the sink along with the second servo motor, the tap, and the gear of the rotary shaft.

13. The sink tap according to claim 1, wherein the second servo motor automatically lowers when a sensor detects the proximity of a lower portion of the first stage shelf to the tap.

14. The sink tap according to claim 13, wherein the first servo motor rotates the screw bar at one end of the screw bar.

15. The sink tap according to claim 14, wherein the screw bar is rotated by only the first servo motor.

16. The sink tap according to claim 14, wherein the upper stage shelf is movable down via the motion of the first stage shelf to a position allowing access for a user in a wheelchair; and
wherein the screw bar stops the upper stage shelf from moving up and down due to a weight applied to the upper stage shelf.

17. The sink tap according to claim 16, wherein the screw bar prevents the upper stage shelf from falling.

18. The sink tap according to claim 16, wherein the screw bar stops the upper stage shelf from moving up and down at a given position along the screw bar.

19. The sink tap according to claim 18, wherein the screw bar stops the upper stage shelf from moving up and down only in a predetermined failure condition.

20. A sink tap comprising:
a cupboard;
a pair of shelf frames coupled a panel which, in turn, is coupled to a screw bar in the form of male/female screws;
a first servo motor disposed inside a cupboard frame and coupled to the screw bar, the first servo motor rotating the screw bar such that the panel is movable up and down along rails attached to an inner surface of the cupboard only with the rotation of the screw bar;
the first servo motor coupled to the screw bar at a proximal end of the screw bar along a longitudinal direction of the screw bar, the panel coupled to the screw bar to move up and down along the longitudinal direction of the screw bar;
sliding members coupled directly to the pair of shelf frames, wherein the sliding members are movable up and down with the panel;
a first stage shelf coupled to the sliding members, wherein the first stage shelf is movable forward and backward relative to the pair of shelf frames by means of the sliding members, wherein the first stage shelf is movable up and down with the panel, and wherein the first stage shelf is movable to a position outside the cupboard;

a second stage shelf coupled directly to the pair of shelf frames and above the sliding members, wherein the second stage shelf is movable up and down with the panel;

an upper stage shelf coupled directly to the pair of shelf frames and above the second stage shelf, wherein the upper stage shelf is movable up and down with the panel;

a sink located below the cupboard, the sink coupled to a second screw bar in the form of male/female screws through the rotation of the second screw bar, a tap extending through a hole formed through the sink, wherein the tap is coupled to an elevating bar in such a manner as to move up and down relative to the sink by means of the up and down movements of the elevating bar; and a second servo motor located under the sink, wherein the second servo motor includes a gear of a rotary shaft that moves up and down the elevating bar, and wherein the second servo motor automatically lowers the tap relative to the sink in response to the motion of the first stage shelf;

the second screw bar being rotatably coupled to a third servo motor located under the sink in such a manner as to move the sink up and down by means of the rotation of the second screw bar; and wherein the third servo motor lowers the sink and the tap together.

* * * * *